Feb. 13, 1934.        J. BIJUR         1,946,478
LUBRICATION
Filed Feb. 28, 1931          3 Sheets-Sheet 1
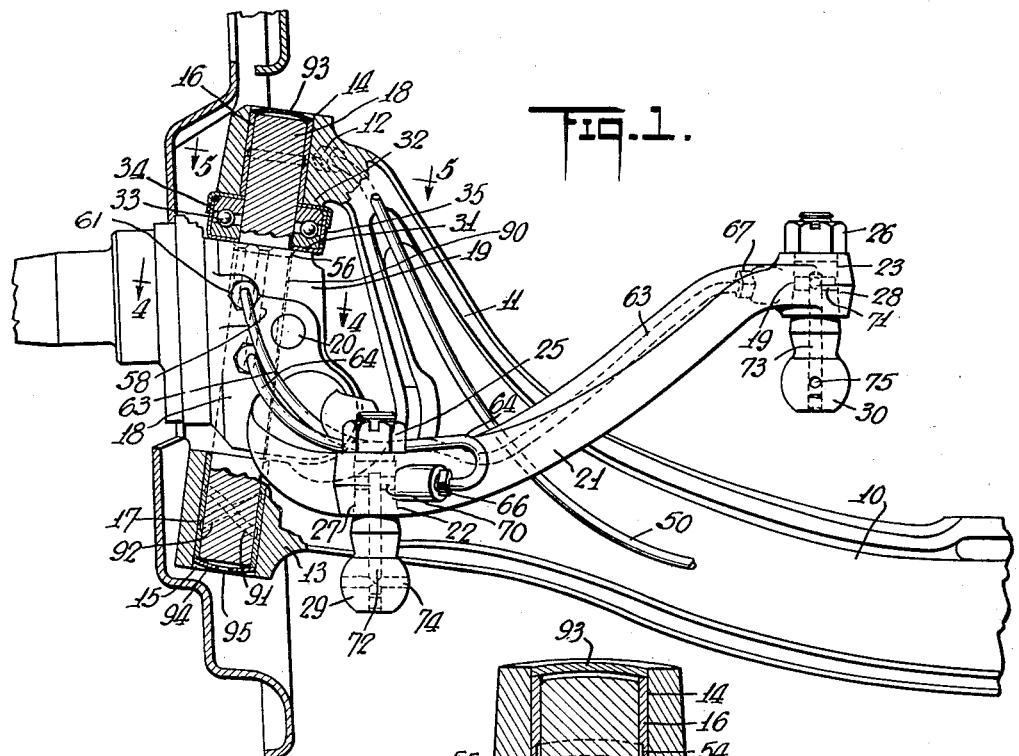
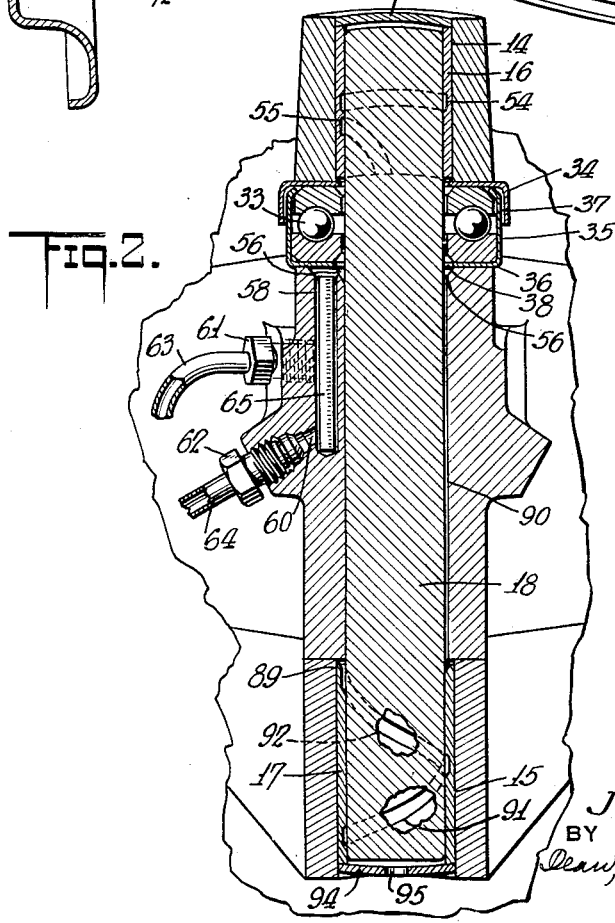
INVENTOR
Joseph Bijur
BY
Dean Fairbank Hirsch & Foster
ATTORNEYS

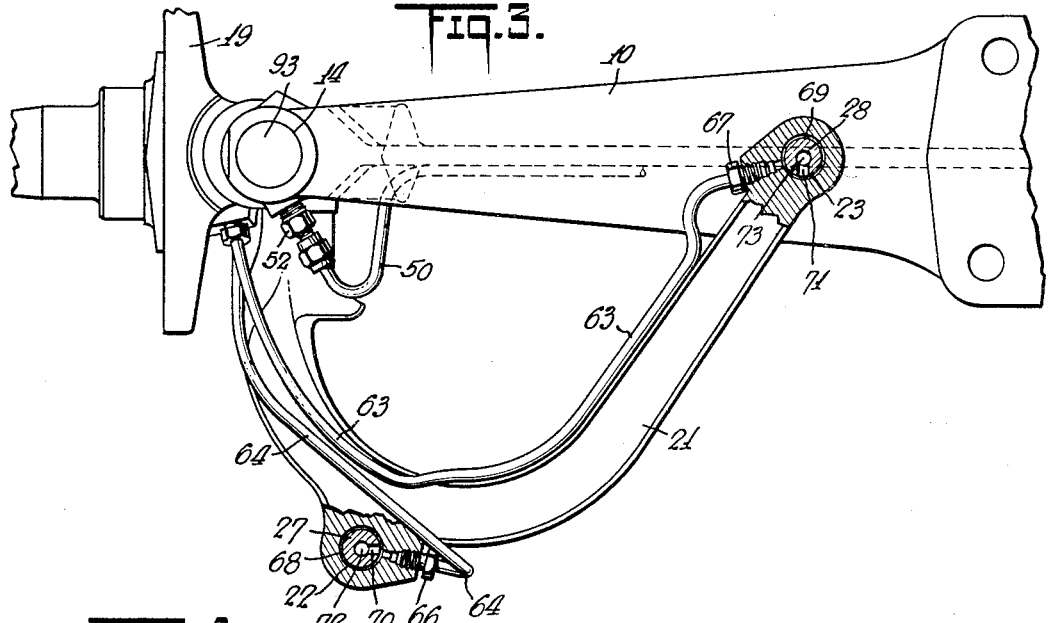
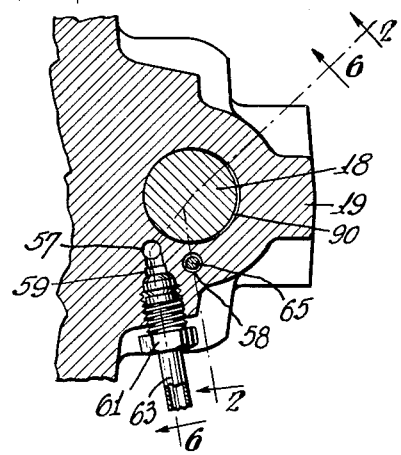
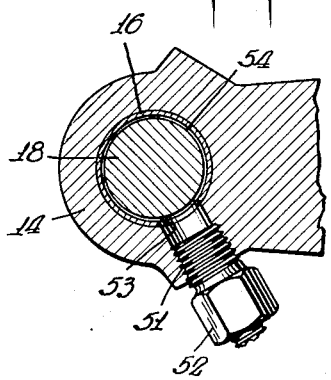
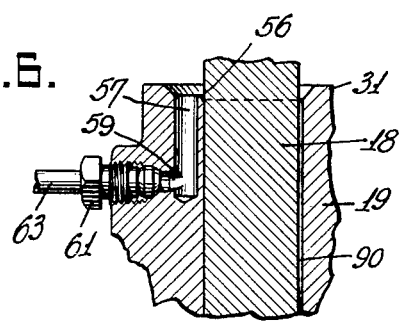
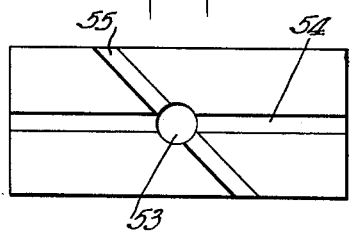

Feb. 13, 1934.    J. BIJUR    1,946,478
LUBRICATION
Filed Feb. 28, 1931    3 Sheets-Sheet 3
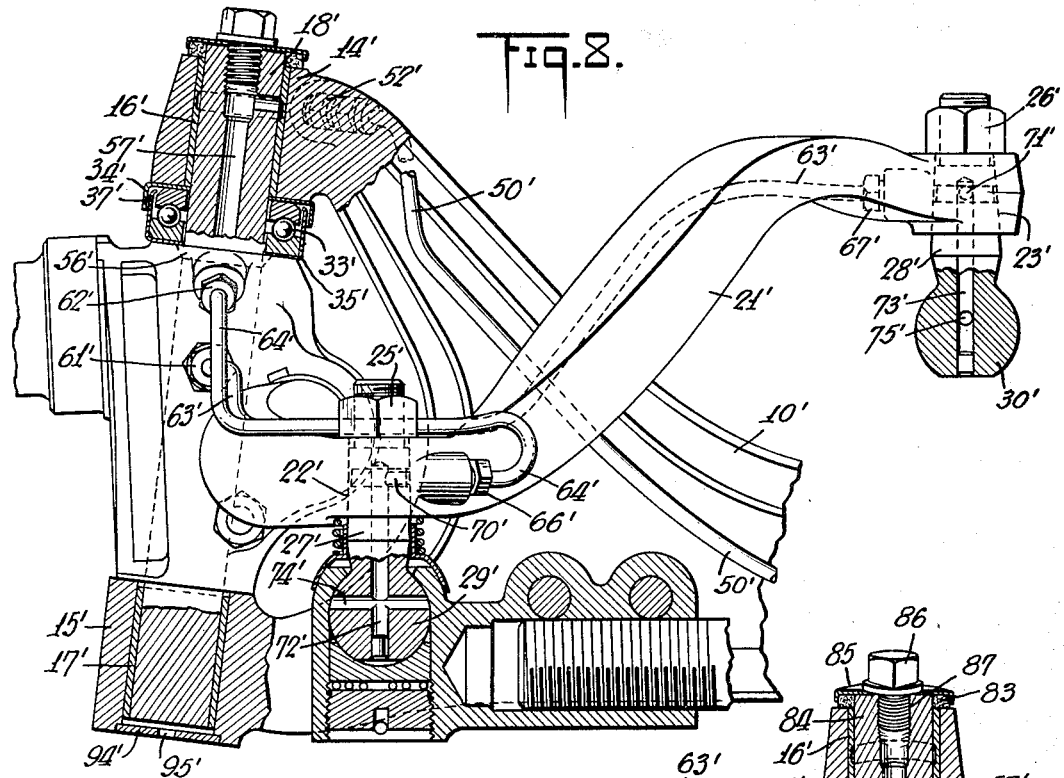
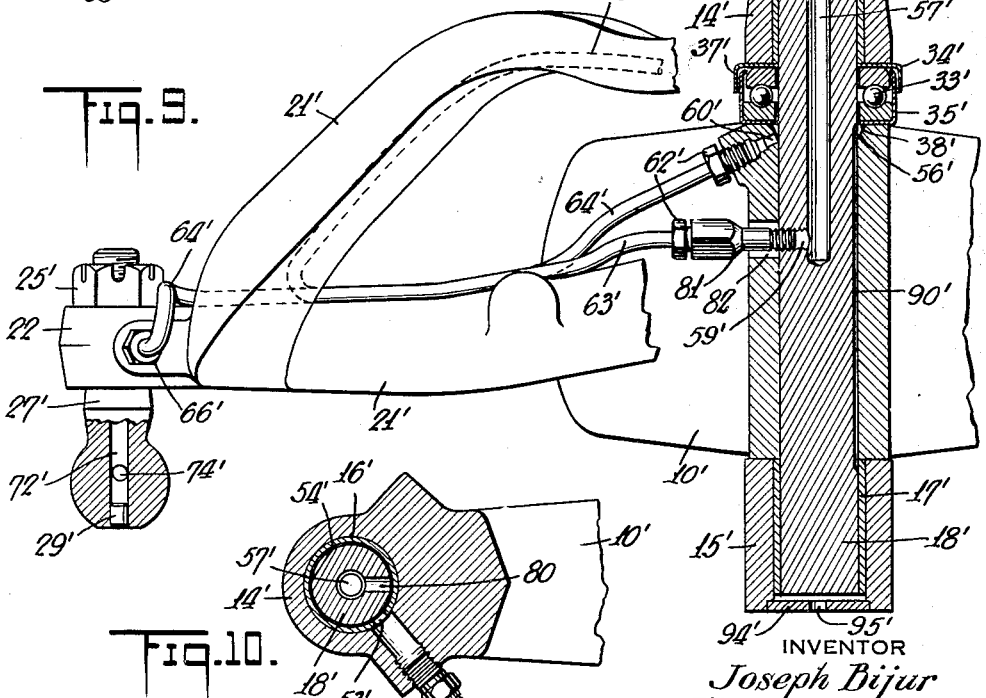
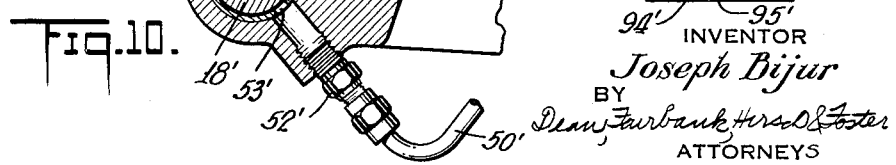
INVENTOR
Joseph Bijur
BY
Dean Fairbank Hirsch & Foster
ATTORNEYS Patented Feb. 13, 1934

1,946,478

UNITED STATES PATENT OFFICE 1,946,478

LUBRICATION

Joseph Bijur, New York, N. Y., assignor to Auto Research Corporation, a corporation of Delaware Application February 28, 1931. Serial No. 518,933

32 Claims. (Cl. 184—7)

My present invention is concerned with gravity flow systems of the general type described in my Patent No. 1,755,628 and my copending application Serial No. 51,733 filed August 22, 1925, and in common with said inventions has a preferred application in association with pressure lubricating systems, more particularly for delivering lubricant by gravity flow from a pressure line to the bearing or bearings of a structure having a swivel or other movable relationship to a main lubricated structure where it is undesirable to convey the lubricant under pressure past or across such swivel or other movable connection, as for example in the case of steering knuckles of automobiles.

In common with my prior application above identified, it is an object of the invention to assure satisfactory lubricant distribution among the bearings of or associated with the steering knuckle, and to preclude irregularity of lubricant feed thereto, or undesirable distribution thereamong due to stanching or air blocking in downwardly extending conduits or piping, or due to siphoning through a bearing at lower level of the lubricant in a pipe or conduit system in communication with a bearing or bearings at higher level.

In common with said prior application, the present invention may preclude the various above enumerated possible defects in operation by venting adjacent a lubricant receiving part of the knuckle and by conveying the lubricant from said vented portion through conduits for the most part preferably of bore so small as to preclude the reverse flow of lubricant and air.

One object of the present invention is to accomplish the desired venting of an installation of the above type by a construction substantially proof against clogging with dust or dirt and which further requires no substantial modification in the construction of steering knuckles in common use.

The object is very advantageously accomplished when a normally-vented encased thrust bearing structure, particularly of the ball or roller bearing type, has sufficient capacity to serve as a distributing receiver and is positioned no lower than the level of the bearings which are to be supplied with lubricant therefrom.

In one embodiment the thrust bearing structure is positioned between the upper clevis jaw of the axle and the knuckle eye of an Elliott type axle and said structure drains to one or more conduit systems leading to the bearing or bearings to be lubricated, the inlet and outlet portions of said conduit system or systems being formed by bores in the knuckle and bearing structures respectively and the intermediate portion being formed by piping extending along the knuckle structure.

Another object is to distribute lubricant according to the general teachings of my prior Patent No. 1,755,628, but in accomplishing this result to avoid the use at the exterior of the knuckle structure of any but conduits or piping of relatively small bore, which are easy to apply, inobtrusive, inexpensive and less likely to be knocked off, damaged or destroyed in use of the vehicle.

In accomplishing this object where it is desired to make portions of a conduit system of bore sufficiently large to pass lubricant and air, as for example the inlet portion of the drag link system down to the level of the lubricant trap therein, the large bore portions of the conduit system are formed completely or in as large part as possible in the knuckle structure itself or in the king pin or another structure rigid with said knuckle. The remainder of the conduit system including any lubricant trap may then be made up of small bore tubing or piping along the exterior of the knuckle.

Other objects are in part obvious and in part pointed out hereinafter.

In the accompanying drawings in which there are shown one or more of the various possible embodiments of the features of this invention:

Figs. 1 and 2 are side and Fig. 3 is a top view, Figs. 1 and 3 being in partial section, and Fig. 2 being in complete section and on an enlarged scale of an axle end and steering knuckle attached thereto showing the application of the lubricant installation of the present invention;

Figs. 4 and 5 are enlarged transverse views and Fig. 6 is an enlarged longitudinal sectional view upon the lines 4—4 and 5—5 of Fig. 1, and 6—6 of Fig. 4, respectively;

Fig. 7 is a development of the interior bearing surface of the upper bushing; and Figs. 8, 9 and 10 are side and top sectional views of another embodiment similar to Figs. 1, 2 and 5.

In Figs. 1, 2 and 3, the axle 10 is provided with a clevis 11, the jaws 12 and 13 of which are provided with eyes 14 and 15, respectively, for receiving the bushings 16 and 17, preferably press-fitted therewithin and serving as bearings for the ends of the king pin 18. The knuckle 19 is fixed to the king pin by means of the wedge pin 20 forming the clearance 90 at the side of the eye adjacent said pin. The knuckle carries the arm 21 provided with the eyes 22 and 23 into which are forced, by means of the nuts 25 and 26, the tapered shanks 27 and 28 of the ball studs 29 and 30, respectively, the first mentioned ball stud being connected to the tie rod and the second mentioned to the drag link. Positioned between the upper face 31 of the knuckle and the lower face 32 of the clevis jaw 12 is the ball thrust bearing 33 enclosed by the telescoping shells 34 and 35. The lower shell 35 is attached in a lubricant tight fashion to the top of the knuckle structure and sufficient space 37 is left between the telescoped portions of the shells 34 and 35 to permit venting of the thrust bearing structure, without at the same time permitting of the entrance of any substantial amount of dirt or dust.

Extending along the axle 10 is a lubricant conduit 50 which may be coupled to the socket 51 in the upper clevis jaw (see Fig. 5) through a drip plug 52. The conduit 50 and the drip plug 52 may be part of a lubricating installation as described and shown in my Patent No. 1,632,771 or in my application Serial No. 468,790, filed July 18, 1930. The socket 51 communicates with the upper king pin bearing surface by means of an opening 53 in the upper bushing 16, the interior portion of the bushing being provided with circumferential and spiral grooves 54 and 55, respectively, for distributing lubricant over said upper bearing surface (see particularly Fig. 7). The excess lubricant from the upper bearing will seep downwardly to the top 31 of the knuckle 19 and will collect in the thrust bearing structure 34—35, which communicates by the annular opening 38 and the depression 56 with the knuckle bores or wells 57 and 58. These bores communicate by means of the transverse bores 59 and 60 and the couplings 61 and 62 with the conduits 63 and 64, respectively, said conduits being preferably, for sake of economy and neatness, of small bore insufficient to permit of the reverse flow of lubricant and air. These conduits extend along the arm 21 and are coupled at 67 and 66 to sockets communicating with circumferential grooves 69 and 68 in the shanks 28 and 27 of the ball studs 30 and 29, respectively. The grooves 68 and 69 by the radial bores 70 and 71, the axial bores 72 and 73 and the radial bores 74 and 75 communicate with the bearing surfaces of the ball studs 29 and 30.

In operation the lubricant will be supplied through the pipe 50, the drip plug 52 and the bushing opening 53 to the distributing grooves 54 and 55 in the upper king pin bearing. The excess lubricant will collect and well up in the thrust bearing structure 34—35, the depth of the lubricant therein being greater in the case of a shot or intermittent system than in the case of a continuous system and being controlled by the rating of the flow metering device or drip plug 52. In the case of an intermittent or shot system, the volume of the shot should not be sufficient to cause overflowing from the thrust bearing structure 34—35, while in the case of a continuous system, it is desirable that the supply of lubricant be maintained at such a rate that a substantial head of lubricant will result within said thrust bearing structure. The lubricant will flow slowly therefrom through the annular opening 38 in the thrust bearing cup 35 and the depression 56, into the wells 57 and 58.

The wells 57 and 58 supplying, respectively, the drag link and the tie rod balls 29 and 30 are of substantially different depth so that there will be no interference between the couplings 61 and 62, in this particular embodiment the well leading to the drag link being substantially deeper than the one leading to the tie rod, but at the same time having its capacity restricted greatly by the insertion of the filler pin 65, so that the tendency of the tie rod bearing to receive excessive quantities of lubricant to the deprivation of the drag link bearing due to its lower level and its continuously downwardly extending feed conduit is avoided.

The clearance 90 between the king pin and the knuckle eye will permit some of the lubricant from the depression 56 to flow to the lower king pin bearing where it will be collected by the bevel 89 in the top of the bushing 17 and distributed by the continuous spiral grooves 91 and 92 on the interior of the bushing surface. The outer ends of the king pin bearing surfaces are protected from dirt and dust by the caps or plugs 93 and 94, the lower cap or plug being provided with an opening 95 to vent the space below the lower king pin bearing to release excess lubricant supplied to said bearing.

Inasmuch as the tie rod conduit system 60, 64 and the conduits in the stud 29 extend continuously downwardly and is under atmospheric pressure at both ends, there will be little difficulty withstanding. In the drag link conduit system the relatively wide diameter bore 57, extending downwardly from the distributing receiver or thrust bearing structure 34—35 to the level of the drag link bearing, eliminates the tendency toward air blocking in the flow of lubricant from the top of said conduit system to the level of the trap which is approximately at the level of the transverse bores 71 in the shank 28 of the drag link stud. Since the vented distributing receiver or thrust bearing structure 34—35 affords the only connection between the drag link conduit system and the tie rod system, or between either of these systems and the lower king pin bearing, there is substantially no danger of siphoning through one bearing from another at a higher level. By venting the tie rod conduit system to obviate the necessity of using any large bore conduits therein and by forming all portions of the drag link conduit system, desirably or necessarily of large bore, interiorly of the knuckle structure, as in the case of bore 57, a greater neatness and increased economy results, since only relatively inobtrusive and inexpensive small bore piping need be utilized upon the outside of the knuckle structure.

In Figs. 8 to 10 is shown a modified construction (similarly functioning parts being designated by the same numerals primed). In this embodiment only the tie rod bearing and the lower king pin bearing are fed from the vented thrust bearing 33', the former by a conduit system consisting in part of the knuckle bore 60' and the piping 64' and the latter by means of a flat 90' extending from the thrust bearing to just below the upper end of the lower king pin bushing 17'. The drag link bearing in this embodiment is fed by means of a wide bore well 57' extending downwardly through the king pin to a level substantially below that of the drag link ball stud 30', said well 57' receiving its lubricant supply from the inlet 52' by means of the bushing opening 53', the circumferential bushing groove 54' and the radial king pin bore 80. An outlet connection 81 threaded into the tapped radial king pin bore 59' passes through an opening 82 in the side of the knuckle eye and by means of the coupling 62' serves to connect the well 57' with the piping 63'. The upper end of the upper king pin bearing is protected against dirt and moisture by means of the annular felt gasket 83 which encircles the upper protruding end 84 of said king pin and is held in place against the top of the upper clevis jaw 14' and the upper end of the bushing 16' by means of the cap 85 which is attached to the top of the king pin by means of the stud 86 threaded into the upper tapped portion 87 of the well or bore 57'.

The wide bore well 57' will assure admission of lubricant to the drag link conduit system without air blocking since it is of sufficient bore to permit of reverse flow of lubricant and air and although it need only extend down to the level of the transverse bores 71' it is extended an additional distance therebelow in order that ready connection thereto may be made through the knuckle eye.

In Fig. 8 the rod ball 29' is shown enclosed in the end of the tie rod, which rod of course may be of any conventional construction.

The thrust bearing structure may be replaced by other vented distributing receivers, and it also may be positioned in different locations upon the knuckle. As for example in the reverse Elliott type where the knuckle is clevised such vented thrust bearing may be positioned above the upper jaw of the clevis or above the lower jaw of the clevis and below the axle eye.

By way of illustration in application of the present invention to automobiles in the Temperate Zone with the normal lubricants used for chassis lubrication, it has been found satisfactory to form small conduits which will not pass lubricant and air with bores of from about $\frac{1}{16}$ inch to $\frac{1}{8}$ inch, while the larger conduits which will permit of reverse flow may have bores of about $\frac{1}{4}$ inch.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. In combination with a motor vehicle having an axle and a knuckle pivotally attached thereto, a lubricating installation for the bearings associated therewith comprising a lubricant supply, a vented distributing receiver associated with said structure substantially below said source and below at least one of the bearings and above other of said bearings and a system of passageways leading from said source to said higher bearing and to said receiver and from said receiver to said lower bearings.

2. In combination with a motor vehicle of the type including an axle and a knuckle pivotally attached thereto, said axle being sustained upon said knuckle by an enclosed, vented thrust bearing structure; a lubricating installation for bearings associated therewith comprising a lubricant supply from adjacent the top of the knuckle delivering lubricant to the thrust bearing enclosure and a conduit system leading from said thrust bearing enclosure to various of said bearings therebelow.

3. In combination with a vehicle of the type having an axle, a knuckle pivotally attached thereto and a thrust bearing supporting said axle upon said knuckle and consisting in part of a pair of bearing elements and of a vented cup-shaped enclosure therefor fixed in lubricant tight manner to the upper part of the knuckle, said knuckle having associated bearings below said thrust bearing; a lubricating installation for the bearings associated therewith including a source for supplying lubricant to said enclosure and a conduit system leading from said enclosure to various of said associated bearings therebelow.

4. In combination with a motor vehicle of the type including an axle and a knuckle, one of which is clevised and embraces the other, a lubricating installation for bearings associated therewith comprising a source of lubricant, a vented distributing receiver positioned between one of the clevis jaws and the other member adjacent thereto, receiving lubricant from said source, and a conduit system leading from said receiver to various of said associated bearings therebelow.

5. In combination with a motor vehicle of the type including a clevised axle, a knuckle provided with an eye and embraced by said clevis, a king pin fixed in said knuckle eye and bearing within the clevis jaws of said axle and an anti-friction bearing encircling said king pin and positioned between the upper clevis jaw and the knuckle eye, said structure being enclosed by vented telescoping cups, the lower of which is fixed in a lubricant tight fashion to the top of the knuckle eye; a lubricating installation for bearings associated therewith comprising a lubricant source for supplying lubricant to said thrust bearing and a lubricant conduit system leading from said thrust bearing to various of said associated bearings positioned therebelow.

6. In combination with a motor vehicle of the type having a clevised axle and a knuckle straddled by said clevis and carrying drag link and tie rod bearings; a lubricating installation comprising a lubricant inlet adjacent the upper clevis jaw, a distributing receiver positioned between the upper clevis jaw and the knuckle, passageways along the upper king pin bearing surface from said inlet to said receiver, bores from said receiver through the knuckle structure longitudinally of the king pin and piping communicating with said bores along said arm leading to said tie rod and drag link bearings, said bores being positioned closely adjacent to each other in the knuckle structure and being made of substantially different depths so that there will be no interference between the connections of said bores to said piping.

7. In combination with a motor vehicle of the type having a clevised axle, a knuckle provided with an eye straddled by said clevis, a king pin fixed in the knuckle eye, the ends of which protrude into and bear within the clevis jaws and bushings fixed within said clevis jaws and encircling the protruding ends of the king pin and a thrust bearing positioned between the upper clevis jaw and the knuckle and encircling the king pin; a lubricating installation comprising a lubricant inlet at the upper clevis jaw and lubricant passageways along the upper king pin bearing, said inlet passing through the clevis jaw and through the upper king pin bushing between the upper and lower ends of said bushing into the middle of the bearing surface.

8. In combination with a motor vehicle of the type having an axle and a knuckle, one of which is provided with an eye and the other with a straddling clevis, a king pin forming a pivotal mount therebetween and fixed in the eye, the ends of which king pin protrude into and bear within the clevis jaws, bushings fixed in said clevis jaws and encircling the protruding ends of the king pin and a thrust bearing positioned between the upper clevis jaw and the knuckle and encircling the king pin; a lubricating installation comprising a lubricant inlet adjacent the upper clevis jaw and lubricant passageways along the upper king pin bearing surface from said inlet to said thrust bearing, said passageways along the upper king pin bearing consisting in part of a groove in the inside bearing surface of the upper king bushing.

9. In combination with a motor vehicle of the type having an axle and a knuckle one of which is provided with an eye and the other with a straddling clevis, said knuckle carrying drag link and tie rod bearings and a king pin fixed in the eye, the ends of which protrude beyond said eye and bear within the clevis jaws; a lubricating installation comprising a lubricant source adjacent the upper end of the king pin, bores through the knuckle structure longitudinally of the king pin in lubricant-intercepting relationship with said source and piping communicating with said bores leading along the knuckle structure to said tie rod and drag link bearings, the bore connecting with the piping leading to the tie rod bearing being substantially restricted.

10. In combination with a motor vehicle of the type having a clevised axle, a knuckle provided with an eye straddled by said clevis and having an outwardly extending arm carrying drag link and tie rod ball studs, a king pin fixed in the knuckle eye, the ends of which protrude into and bear within the clevis jaws, and a thrust bearing positioned between the upper clevis jaw and the knuckle and encircling the king pin; a lubricating installation comprising a lubricant inlet adjacent the upper clevis jaw, passageways along the upper king pin bearing surface from said inlet to said thrust bearing, bores through the knuckle structure longitudinally along the king pin and piping communicating with said bores and extending along said arm leading to said ball studs, the bore connecting with the piping leading to the tie rod stud being substantially filled by a pin to restrict the amount of lubricant flowing to said tie rod bearing.

11. In combination, an axle and a knuckle, one of which is provided with a clevis which straddles an eye carried by the other and forms the bearings for the protruding ends of a king pin fixed in said eye and an inlet to supply lubricant to the upper king pin bearing, the king pin being fixed in the eye with sufficient clearance to permit lubricant to flow from the upper king pin bearing through said clearance to the lower king pin bearing.

12. In combination, an axle and a knuckle, one of which carries a clevis straddling an eye carried by the other and forming bearings for the protruding ends of a king pin fixed in said eye, bushings inserted in said clevis jaws and an inlet supplying lubricant to the upper king pin bushing, the interior bearing surface of both of said bushings being provided with distributing grooves and the king pin being fixed in said eye with such clearance as to conduct lubricant from the upper king pin bushing to the lower king pin bushing.

13. In combination, an axle and a knuckle, one of which carries an eye and the other of which carries a clevis straddling said eye and forming bearings for the protruding ends of a king pin fixed in said eye, bushings inserted in said clevis jaws and an inlet supplying lubricant to the upper king pin bushing, the king pin being fixed in said eye with such clearance as to permit a desirable amount of lubricant to flow from the upper king pin bearing to the lower king pin bearing and the upper end of the lower king pin bushing being provided with an inner bevel collecting said lubricant and supplying it to the lower king pin bearing surface.

14. A lubricating installation for a king pin forming a pivotal mount between an axle and a knuckle, and having its upper and lower ends protruding into and bearing within the jaws of a clevis affixed to one of said elements and having its intermediate portion fixed with a small clearance within an eye constituting part of the other of said elements, said installation being formed substantially without mutilating the king pin and consisting in part of passageways in the bearing surfaces of the upper and lower clevis jaws, interconnected by means of said clearance, with a lubricant inlet adjacent the upper king pin bearing and a lubricant drain outlet below the lower king pin bearing.

15. In combination with a motor vehicle of the type having a clevised axle, a knuckle provided with an eye straddled by said clevis and having an outwardly extending arm carrying a tie rod bearing, a king pin fixed in the knuckle eye, the ends of which protrude into and bear within the clevis jaws, and a thrust bearing positioned between the upper clevis jaw and the knuckle and encircling the king pin; a lubricating installation comprising a lubricant source adjacent the upper end of the king pin, passageways along the upper king pin bearing surface from said inlet to said thrust bearing, a bore from said thrust bearing through the knuckle structure and piping communicating with said bore extending along said arm leading to said tie rod bearing, the king pin being fixed in the knuckle eye with sufficient clearance to permit a desirable amount of lubricant to flow down along the king pin to the lower king pin bearing from said thrust bearing.

16. In combination with a motor vehicle of the type having a clevised axle, a knuckle with an eye straddled thereby and a king pin fixed in said eye with small clearance and forming a pivotal mount therebetween, said knuckle carrying drag link and tie rod bearings; a lubricating installation comprising a lubricant inlet rigid with the axle and admitting lubricant to the upper king pin bearing, collecting wells at the upper part of the knuckle structure supplying the tie rod and drag link bearings, said collecting wells being so proportioned in respect to the clearance between the knuckle eye and the king pin and to each other that they will properly proportion the lubricant amongst the lower king pin bearing, the tie rod and the drag link bearings.

17. In combination with a motor vehicle having a clevised axle, a knuckle with an eye straddled thereby and carrying a tie rod bearing and a king pin fixed in said knuckle eye with small clearance and bearing within the jaws of said clevis; a lubricating installation comprising an inlet rigid with the upper clevis jaw, a passageway through and along the knuckle leading to the tie rod bearing in lubricant-intercepting relationship with respect to said inlet, the inlet area of said passageway and the clearance between the king pin and the knuckle eye being so proportioned that a proper division of lubricant between the lower king pin bearing and the tie rod bearing will ensue.

18. In combination with a motor vehicle of the type having a clevised axle, a knuckle provided with an eye straddled by said clevis and having an outwardly extending arm carrying drag link and tie rod ball studs, a king pin fixed in the knuckle eye, the ends of which protrude into and bear within the clevis jaw, and a thrust bearing positioned between the upper clevis jaw and the knuckle and encircling the king pin; a lubricating installation comprising a lubricant inlet adjacent the upper clevis jaw, passageways along the upper king pin bearing surface from said inlet to said thrust bearing, bores from said thrust bearing through the knuckle structure and piping communicating with said bores and extending along said arm leading to said ball studs, the upper portion of the knuckle being provided with a shallow well below the thrust bearing encircling the king pin and said bores being in communication with the bottom of said well.

19. A lubricating installation for the associated bearings of a steering knuckle-axle pivotal arrangement comprising a lubricant supply and a series of passageways consisting in part of bores through the pivotal arrangement and piping along the outside of the arrangement for conducting lubricant from said supply to said associated bearing, said passageways being in substantial part of wide bore to permit of the reverse flow of lubricant and air and the portions of the passageways of such bore being formed by the bores within the interior of the arrangement.

20. In combination with a motor vehicle of the type including an axle and a steering knuckle pivotedly attached thereto and carrying a bearing at the end of an outwardly extending arm; a lubricating installation comprising a lubricant inlet rigid with the axle, a bore passing downwardly through a part rigid with the knuckle in lubricant-intercepting relationship with respect to said inlet and piping in lubricant-intercepting relationship with respect to said bore leading along said arm to said bearing, said bore being of sufficient diameter to permit of the reverse flow of lubricant and air and said piping being of insufficient diameter for this purpose.

21. In combination with a motor vehicle of the type including an axle and a knuckle, one of which is clevised to straddle the eye of the other, a king pin affixed to one of said elements and pivotally bearing in the other and a control bearing carried by said knuckle; a lubricating installation for said control bearing comprising a lubricant inlet, vertical and transverse interior bores rigid with the knuckle structure and of sufficient width to permit of the reverse flow of lubricant and air and piping of insufficient bore for such purpose along the outside of said knuckle leading to said bearing from said bores.

22. In combination with a motor vehicle of the type including a clevised axle, a knuckle with an eye straddled thereby and a king pin extending through said eye and through the jaws of said clevis and forming a pivotal connection between said axle and said knuckle; a lubricating installation comprising a lubricant inlet in the upper clevis jaw into the upper king pin bearing intermediately thereof and axial and radial bores in the king pin in lubricant-intercepting relationship with respect to said inlet.

23. In combination with a motor vehicle, a clevised axle, a knuckle with an eye straddled thereby, a bored king pin extending through said eye and through the jaws of said clevis and forming a pivotal connection between said axle and said knuckle, said bore serving to conduct lubricant and being tapped at its upper end, and means to maintain the upper king pin bearing dust-and-moisture-tight and to seal said bore including an annular gasket encircling the king pin and closing off the top of the upper king pin bearing, an annular cap pressing down upon said gasket, and a screw threaded into said tapped bore and firmly clamping said cap against said gasket.

24. In combination with a motor vehicle of the type including a clevised axle, a knuckle with an eye straddled thereby, said eye having an opening in the side thereof and a king pin extending through said eye and through the jaws of said clevis and forming a pivotal connection between said axle and said knuckle; a lubricating installation comprising an inlet rigid with the axle, an axial bore in the king pin extending from said inlet downwardly to within the portion of the king pin enclosed by the knuckle, a tapped radial bore in the side of the king pin and an outlet fitting from said king pin bore passing through said opening in the knuckle eye and threaded into said socket.

25. In combination with a motor vehicle having an axle and a knuckle pivotally attached thereto, a lubricating installation for the bearings associated therewith comprising a lubricant supply, a vented distributing receiver associated with said structure substantially below said source and below at least one of the bearings and above other of said bearings and a system of passageways leading from said source to said higher bearing and to said receiver and from said receiver to said lower bearings, the knuckle carrying a tie rod bearing and being pivotally connected to the axle by a king pin, and the receiver being positioned below the upper king pin bearing and above the tie rod bearing.

26. In combination with a motor vehicle of the type including an axle and a knuckle, one of which is clevised and embraces the other, a lubricating installation for bearings associated therewith comprising a source of lubricant, a vented distributing receiver positioned between one of the clevis jaws and the other member adjacent thereto, receiving lubricant from said source, and a conduit system leading from said receiver to various of said associated bearings therebelow, the distributing receiver consisting in part of a thrust bearing structure having two thrust bearing elements enclosed in a cup-shaped receiver affixed in a lubricant tight manner to a part of the knuckle structure.

27. In combination with a motor vehicle of the type including an axle and a knuckle, one of which is clevised and embraces the other, a lubricating installation for bearings associated therewith comprising a source of lubricant, a vented distributing receiver positioned between one of the clevis jaws and the other member adjacent thereto, receiving lubricant from said source, and a conduit system leading from said receiver to various of said associated bearings therebelow, the axle being the clevised member and the distributing receiver being positioned between the upper clevis jaw and the top of the knuckle.

28. In combination with a motor vehicle of the type including an axle and a knuckle, one of which is clevised and embraces the other, a lubricating installation for bearings associated therewith comprising a source of lubricant, a vented distributing receiver positioned between one of the clevis jaws and the other member adjacent thereto, receiving lubricant from said source, and a conduit system leading from said receiver to various of said associated bearings therebelow, the knuckle being provided with an eye which is embraced by a clevised axle and a king pin being fixed in said axle eye and protruding therebeyond to bear in the clevis jaw and the distributing receiver being annular in shape, encircling the king pin and being positioned between the upper clevis jaw and the top of the knuckle eye.

29. In combination with a motor vehicle of the type including an axle and a knuckle, one of which is clevised to straddle the eye of the other, a king pin affixed to one of said elements and pivotally bearing in the other and a control bearing carried by said knuckle; a lubricating installation for said control bearing comprising a lubricant inlet, vertical and transverse interior bores rigid with the knuckle structure and of sufficient width to permit of the reverse flow of lubricant and air and piping of insufficient bore for such purpose along the outside of said knuckle leading to said bearing from said bores, the vertical and transverse bores being in the knuckle structure exteriorly of the king pin.

30. In combination with a motor vehicle of the type including an axle and a knuckle, one of which is clevised to straddle the eye of the other, a king pin affixed to one of said elements and pivotally bearing in the other and a control bearing carried by said knuckle; a lubricating installation for said control bearing comprising a lubricant inlet, vertical and transverse interior bores rigid with the knuckle structure and of sufficient width to permit of the reverse flow of lubricant and air and piping of insufficient bore for such purpose along the outside of said knuckle leading to said bearing from said bores, the vertical and transverse bores being in the king pin.

31. In combination with a motor vehicle of the type including an axle and a knuckle, one of which is clevised to straddle the eye of the other, a king pin affixed to one of said elements and pivotally bearing in the other and a control bearing carried by said knuckle; a lubricating installation for said control bearing comprising a lubricant inlet, vertical and transverse interior bores rigid with the knuckle structure and of sufficient width to permit of the reverse flow of lubricant and air and piping of insufficient bore for such purpose along the outside of said knuckle leading to said bearing from said bores, the vertical bore being axially through the king pin and having entrance and exit transverse bores in the portions enclosed in the upper clevis jaw and in the knuckle eye, respectively.

32. In combination with a motor vehicle of the type including a clevised axle, a knuckle with an eye straddled thereby and a king pin extending through said eye and through the jaws of said clevis and forming a pivotal connection between said axle and said knuckle; a lubricating installation comprising a lubricant inlet in the upper clevis jaw into the upper king pin bearing intermediately thereof and axial and radial bores in the king pin in lubricant-intercepting relationship with respect to said inlet, the axial bore extending entirely through the upper end of the king pin and being plugged at its upper end above the radial bore.

JOSEPH BIJUR.